(12) United States Patent
Thomas et al.

(10) Patent No.: US 7,051,037 B1
(45) Date of Patent: May 23, 2006

(54) SQL-BASED NAÏVE BAYES MODEL BUILDING AND SCORING

(75) Inventors: Shiby Thomas, Nashua, NH (US); Marcos M. Campos, Cambridge, MA (US)

(73) Assignee: Oracle International Corporation, Redwood Shores, CA (US)

( * ) Notice: Subject to any disclaimer, the term of this patent is extended or adjusted under 35 U.S.C. 154(b) by 474 days.

(21) Appl. No.: 10/156,060

(22) Filed: May 29, 2002

(51) Int. Cl.
*G06F 17/30* (2006.01)
(52) U.S. Cl. ................................... 707/102
(58) Field of Classification Search .............. 707/1–10, 707/104.1; 700/31; 705/26, 7; 711/100; 341/107; 345/440
See application file for complete search history.

(56) References Cited

U.S. PATENT DOCUMENTS

| | | | | |
|---|---|---|---|---|
| 6,388,592 B1* | 5/2002 | Natarajan | ............... | 341/107 |
| 6,560,592 B1* | 5/2003 | Reid et al. | ............... | 707/2 |
| 6,750,864 B1* | 6/2004 | Anwar | ............... | 345/440 |
| 2002/0161664 A1* | 10/2002 | Shaya et al. | ............... | 705/26 |
| 2003/0176931 A1* | 9/2003 | Pednault et al. | ............... | 700/31 |
| 2003/0212851 A1* | 11/2003 | Drescher et al. | ............... | 711/100 |
| 2003/0229635 A1* | 12/2003 | Chaudhuri et al. | ............... | 707/6 |
| 2004/0064351 A1* | 4/2004 | Mikurak | ............... | 705/7 |

OTHER PUBLICATIONS

Suequn Shang et al., SQL based frequent pattern mining without candidate generation, 2004, Proc. of the 2004 ACM Symposium on Applied Computing, ACM Press, pp. 618-619.*

Cyrille Masson et al., Optimizing subset queries: a step towards SQL-based inductive databases fro itemsets, 2004, Proc. of th 2004 ACM Symposium on Applied Computing, ACM Press, pp. 535-539.*

Patricia E. N. Lutu, An integrated approach for scaling up classification and prediction algorithms for data mining, 2002, ORACLE, Proc. of the 2002 Annual Conf. of the South African Inst. of Computer Scientists and Infor. Tech., ACM Press, pp. 110-117.*

* cited by examiner

*Primary Examiner*—Diane Mizrahi
(74) *Attorney, Agent, or Firm*—Swidler Berlin LLP

(57) ABSTRACT

The present invention provides an efficient method and system of data mining using SQL queries for model building and scoring. The invention provides a database management system having a database containing data, a database engine operatively connected to process the data, a SQL server operatively connected to the database and a data mining tool, whereby the data mining tool is based on a Naïve Bayes model. The SQL server uses the data and the Naïve Bayes model to develop the data mining tool. The data mining tool is located is located in the database management system. The data mining tool has a model building system based on at least one SQL query and training data, and a scoring system based on SQL queries.

24 Claims, 3 Drawing Sheets

Database Management System
(DBMS)

SQL-BASED NAÏVE BAYES MODEL BUILDING AND SCORING

FIELD OF INVENTION

The present invention relates to data mining. More specifically, the present invention relates to a more efficient method and system of data mining using SQL queries for model building and scoring.

BACKGROUND OF THE INVENTION

As the amount of data expands, the ability to process and comprehend that data becomes more difficult. Patterns and trends are lost in the massive quantities of data stored in databases and data warehouses. As the influx of data increases, the ability to interpret the data also becomes more difficult. Thus, there is a need for a powerful and efficient analytical tool that can process and derive interesting knowledge from the enormous amounts of data available.

Historically, the primary method for analyzing data was to construct well structured hypotheses and test the hypotheses by analyzing data. Today, a method called data mining is one of the new ways of analyzing data. Data mining is an automated process whereby previously unknown relationships among data are discovered. The two main steps of data mining are modeling and scoring. These two steps are typically performed by a data mining tool.

Generally, modeling develops rules from analyzing sets of training data. These rules are used later to examine new cases. For example, a rule could be a set of symptoms that a doctor uses to diagnose a disease. This rule can be derived from a set of patients who had the disease. Once derived, the rule is applied to a larger group of people to assist in determining whether they have that disease. The model that is generated using this training data is then used to make predictions about future patients.

Scoring involves making predictions with the generated model. The numerical values of the scores represent the certainty of each prediction. Scores allow people to access the predictions that were found using the model. Currently, there are several methods for scoring with a model. One method of scoring involves loading data from a database into a model using an Open DataBase Connectivity (ODBC) or Structured Query Language (SQL) cursor. The scoring occurs where the model is stored and the scoring results are transmitted from the model's location to the database. Another method uses a C, C++ or Java function to represent the model. The function may be wrapped in an application, which runs against the data stored in the database. However, this option also involves massive data movement and hence, is inefficient.

Performance-wise these are not efficient options because they involve a lot of data movement from the database to the mining tool's location. Further, many models are unusable because the execution time required is too large to process the data. Thus, there is a need for a more efficient data mining system and method.

SUMMARY OF THE INVENTION

The present invention is a method and system for data mining that utilizes SQL queries for model building and scoring in the database management system (DBMS). The present invention builds a Naïve Bayes model in the database management system, as opposed to in an external data mining server. The system provided in this invention does not require massive data movement between a database system and a data mining server. The method is an efficient process of scoring a large amount of data with a Naïve Bayes data mining model. The present invention makes use of database's indexing and query processing capabilities and thereby leverages the robust nature of the database management systems (DBMS).

One advantage of the present invention is that it reduces data movement and increases the efficiency of the data mining process.

Another advantage of the present invention is that it optimizes performance by using the DBMS's indexing and query processing capabilities. It exploits the scalable, portable, concurrent features of the DBMS.

Another advantage of the present invention is that the mining tool is able to utilize the underlying SQL parallelism implemented in many relational database management systems.

Another advantage of the present invention is that it makes use of the DBMS's support system for checkpointing, recovery and space management for long running model building queries.

Yet another advantage is that the present invention allows fast development of model building and scoring through SQL queries.

Yet another advantage is the lower transfer of data and as a result the reduction of data transfer cost.

The present invention achieves these and other objects using a database management system, comprising: a database containing data; a database engine operatively connected to process the data; a SQL server operatively connected to the database; and a data mining tool, the data mining tool based on a Naïve Bayes model, the SQL server using the data and the Naïve Bayes model to develop the data mining tool.

Other and further objects of the present invention will be apparent from the following description and claims and are illustrated in the accompanying drawings, which by way of illustration, show preferred embodiments of the present invention. Other embodiments of the invention embodying the same or equivalent principles may be used and structural changes may be made as desired by those skilled in art without departing from the present invention and the purview of the appended claims.

The details of the present invention, both as to its structure and operation can best be understood by referring to the accompanying drawings.

DETAILED DESCRIPTION OF THE INVENTION

Figure 1:
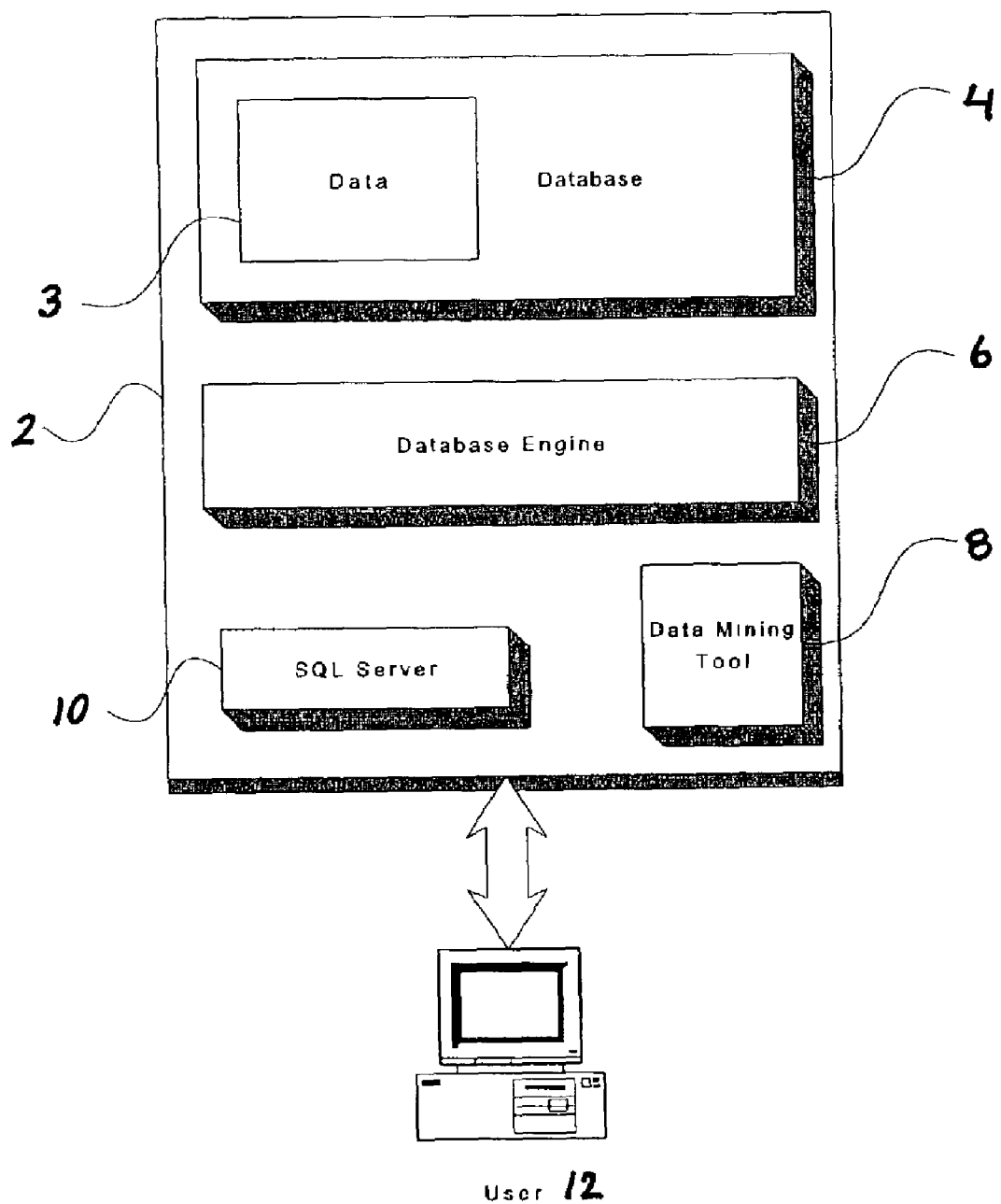
FIG. 1 is a logical block diagram of a database management system (DBMS).
Figure 2:
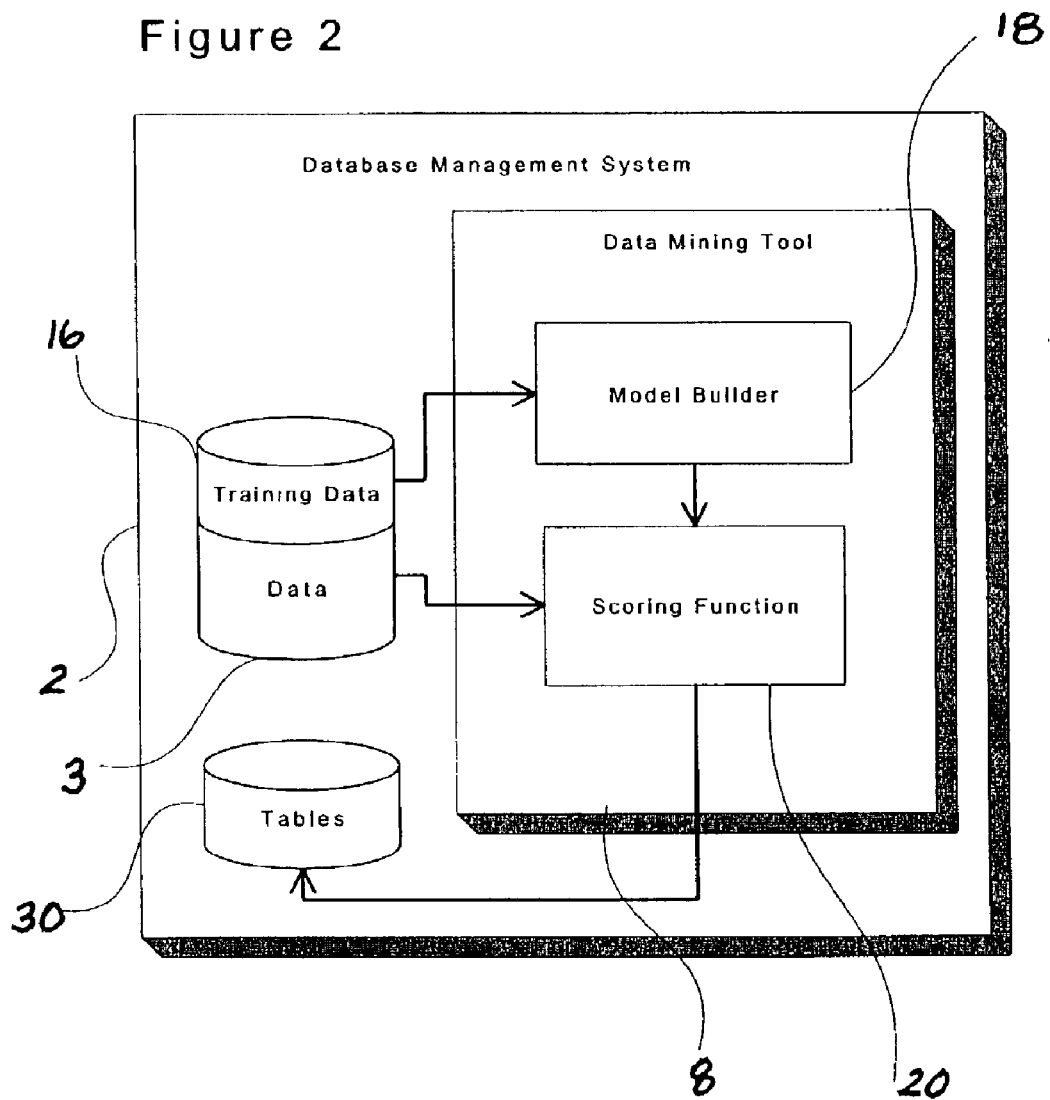
FIG. 2 is a logical block diagram of a database management system (DBMS) that shows further details of the data mining tool.
Figure 3:
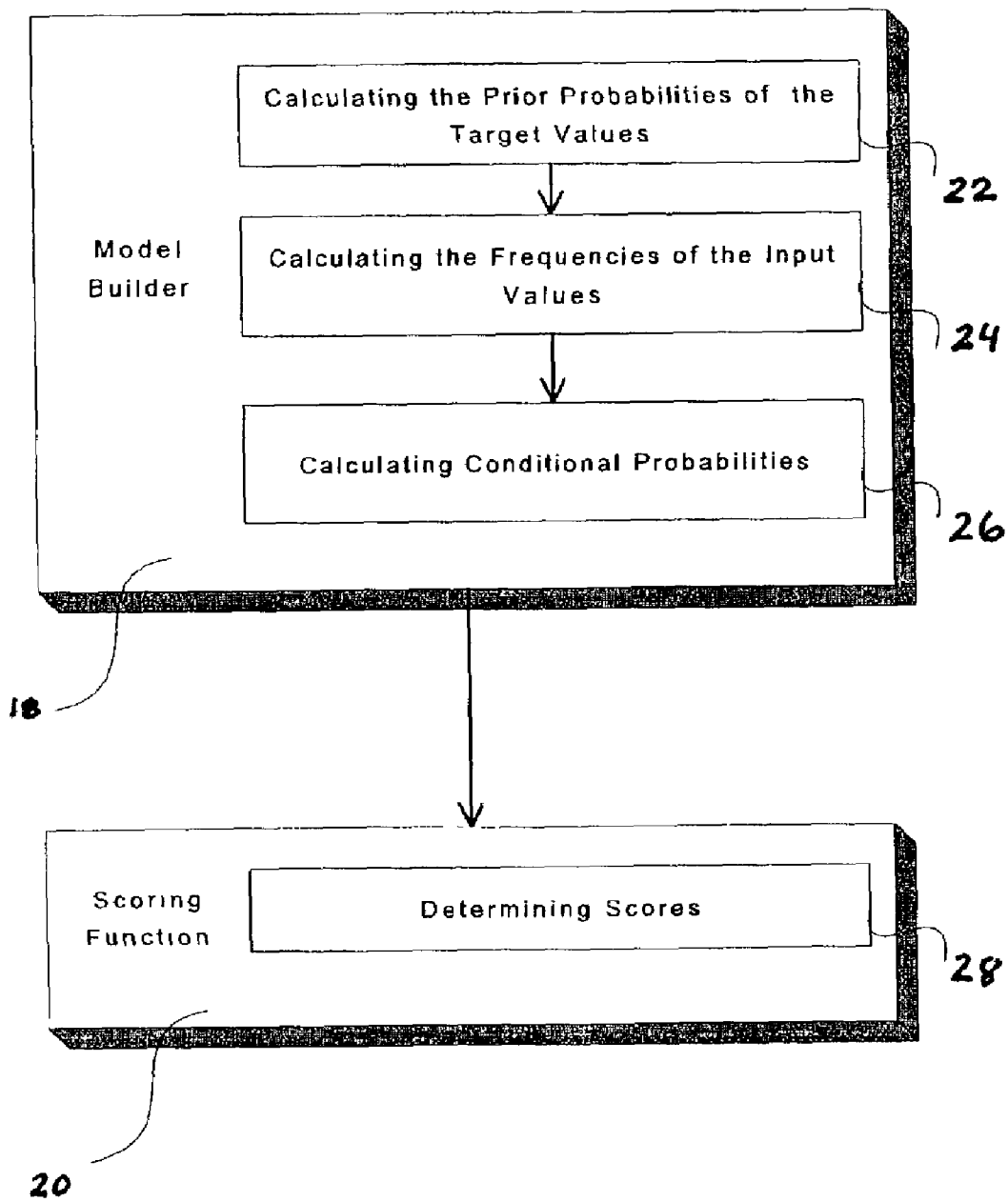
FIG. 3 is a flow diagram showing the processes of the model builder and the scoring function.

Referring to FIGS. 1 through 3, the present invention is described in detail below. The present invention is a method and system for data mining that utilizes SQL queries for model building and scoring. These steps are performed in the database management system (DBMS) 2, as opposed to an outside data mining server.

Referring to FIG. 1, a database 4 is a compilation of data 3 organized so that a computer program can find and access desired pieces of data 3. Databases 4 may be organized using fields, records, and files. A field is a piece of information or data 3. A record is a collection of fields. A file is a set of records. Fields can hold many different structured data 3 types, such as integers, character strings, money, dates, and binary large objects.

A database management system (DBMS) 2 is used to access and organize the data 3 stored in the database 4. A DBMS 2 includes software programs that allow a user 12 to access and organize data 3. In the DBMS 2, a database engine 6 stores, organizes and retrieves data 3. Many types of DBMS's 2 are available. DBMS's 2 may be relational, network, flat, and hierarchical; these terms refer to the method of organizing data 3 within the database 4. These methods have varying effectiveness and flexibility with regards to data extraction. Any type of DBMS 2 is appropriate for the present invention. However, the preferred type of DBMS 3 is a relational DBMS 2 (RDBMS). A relational DBMS 2 maintains data in relational tables. RDBMS involve few assumptions about the relationship of data 3 or the method of data extraction. A key feature of relational systems is that one database 4 can be spread across several tables.

The software languages that manage DBMS 4 are called fourth-generation languages. Requests for information are known as queries; queries are basically stylized questions. A SQL server 10 responds to SQL queries. The present invention utilizes SQL queries to build models and perform scoring. Structured Query Language (SQL) is a standardized query language for requesting information from a database 4. SQL may be used to support distributed databases 4 that are spread out over several computer systems and allow users 12 on local-area networks to simultaneously access the same database 4. SQL permits users 12 to access data 3 in relational database management systems (RDBMS) 2. SQL allows users 12 to describe the data 3 the user 12 wishes to obtain. SQL also permits users 12 to define and manipulate the data 3 in a database 4. There are many different dialects of SQL, but the current standard is known as SAG SQL. Any dialect of SQL maybe used in the present invention. For example, SQL-92 is an appropriate SQL dialect. Further, the SQL queries may be embedded in a native database language such as PL SQL.

In the present invention, a data mining tool 8 is built using SQL in the DBMS 2. By using SQL queries to build the data mining tool 8, the amount of code required is reduced significantly. This is primarily because traditionally the bulk of code for data mining tools 8 deals with data 3 transfer and data structure management. Since the present invention reduces the amount of data 3 transfer and the DBMS 3 handles data management, the code is reduced. Further, locating the data mining tool 8 in the DBMS 2 is desirable for integrating data mining with an overall enterprise data warehousing solution; it reduces the overall complexity in data 3 migration and the associated performance penalties. The present invention makes use of the DBMS's 2 indexing and query processing capabilities and exploits the scalable, portable, concurrent features of the DBMS 2. It utilizes the underlying SQL parallelism implemented in state-of-the-art relational DBMS's 2. Additionally, it makes use of the DBMS 2 support for checkpointing, recovery and space management for potentially long running model building queries.

A data mining tool 8, as shown in FIG. 1, is a system tool that derives patterns and relationships from data 3. Often these patterns and relationships are unknown. Although the data mining tool 8 is shown as separate block in FIG. 2, it is typically part of the functionality of the SQL server 10 and the database engine 6. The data mining tool 8 performs two steps: modeling, and scoring. Referring to FIG. 2, model building is executed by the model builder 18 and scoring is executed by the scoring function 20.

Generally, modeling is the process of developing a set of rules, a model, from training data 16. Training data 16 is a discrete set of data 3 that is typically collected from operational databases. For example, if building a model for churn analysis, the training data is taken from a customer database. The model is used to examine new sets of data 3 in the scoring process. Basically, scoring is the process of applying the model to a new case to make predictions (i.e. scores). The numerical value of the score represents the certainty of each prediction.

In the present invention, Bayesian theory is used to build models and perform the function of scoring. Bayesian theory is a mathematical theory that governs the process of logical inference, it assists in determining what degree of confidence to have of several possible conclusions. Naïve-Bayes is a classification technique that uses Bayesian theory. Naïve-Bayes efficiency and simplicity allows it to be used for modeling and scoring. For example, Naïve-Bayes can generate a model after analyzing a data 3 set once. Naïve Bayes is also a very efficient technique with respect to creating models and making predictions from partial data 3. The model builder 18 and scoring function 20 utilize Naïve Bayes to build models and score.

Naïve Bayes Algorithm (NBA) makes predictions using Bayes' Theorem, which provides an equation for deriving the probability of a prediction based on a set of underlying evidence. The NBA module makes a simplifying assumption that the pieces of evidence are not interrelated in a particular way. This assumption is what is called the naïve aspect of the algorithm (here, "naïve" is a technical term, not a disparagement).

The NBA module affords fast training and prediction. It can be extended to support efficient incremental training, in which new training data are used with a model already trained with previous data, without having to re-train from scratch with the previous data; and distributed training, in which the results of separate training sessions on separate collections of data are combined into a single predictive model.

Internally, the Bayes module works with categorical rather than numeric data. The data for model building needs to be discretized so as to have only categorical values.

Bayes' Theorem proves the following equation:

$$P(\text{this-prediction}|\text{this-evidence}) = \frac{P(\text{this-prediction}) \cdot P(\text{this-evidence}|\text{this-prediction})}{\sum (\text{some-prediction}) \cdot P(\text{this-evidence}|\text{some prediction})}$$

where P means "probability of", "|" means "given", and "Σ" means "sum of". In other words, the equation says that the probability of a particular predicted event, given the evidence in this instance, is computed from three other numbers: the probability of that prediction in similar situations in general, ignoring the specific evidence (this is called the prior probability); multiplied by the probability of seeing the evidence present in a given situation, given that the particular prediction is correct; divided by the sum, for each possible prediction (including the present one), of a similar product for that prediction (i.e., the probability of that prediction in general, times the probability of seeing the current evidence given that possible prediction).

For example, consider a pregnancy test that is good but not perfect. Let's say that 99% of specimens from pregnant persons yield a positive reaction; similarly, 99% of specimens from persons who are not pregnant yield a negative reaction. Suppose we get a positive response in a particular instance. What is the probability that the person tested is in fact pregnant (the prediction), given the positive reaction (the evidence)? By Bayes' Theorem, the answer is: the probability that the person is pregnant in the absence of any test result (the prior probability), times the probability of seeing a positive test reaction for a pregnant person (99%, by the above assumption), divided by the sum of the product just computed, plus the similar product for the non-pregnant prediction.

Another example helps illustrate why the prior probability must be included. Suppose the pregnancy test is administered to 1,000 men. According to the presumed accuracy of the test, about 10 of those men (1%) will test positive. What is the probability that they are actually pregnant? It is 0%, not 99%, despite the 99% accuracy of the test, in the sense defined above. The prior probability in this case is 0%, so the entire Bayes' Theorem expression equals zero. In less extreme examples, the prior probability may not be zero, however the previous example illustrates why it must still be taken into account.

To apply the above formula directly, we would need to tabulate P(evidence|prediction) separately for each evidence-prediction combination, with a different version for each combination of values from all the columns. Since no entire combination is likely to be duplicated exactly, such a tabulation would be infeasible. Instead, the NBA makes a simplifying assumption (the "naive" part alluded to previously). It assumes that $$P(ABC \ldots | \text{this-prediction}) = P(A|\text{this-prediction})P(B|\text{this-prediction})P(C|\text{this-prediction})$$

where A, B, and C are the particular values in this instance (i.e., for this row) of all the non-target columns. Thus, the assumption is that the probability of the combined pieces of evidence (given this prediction) is the product of the probabilities of the individual pieces of evidence (given this prediction). The assumption is true when the pieces of evidence work independently of one another, without mutual interference. In other cases, the assumption merely approximates the true value. In practice, the approximation usually does not degrade the model's predictive accuracy, and makes the difference between a computationally feasible algorithm and an intractable one.

From the preceding discussion, it is clear that in order to build the Naïve Bayes model, we only need to compute the prior probability of each target column value, which is the value that needs to found, and the conditional probabilities P(X|target value) for each target value and each non-target column value X. These probabilities are computed using SQL queries.

A SQL query for computing prior probabilities can be used as an example of how the Naïve Bayes model works. Let T be the input table containing the training data set. Let the schema of T be ($A_1$, $A_2$, . . . , $A_n$, target). The prior probability of each distinct value of the target column, $t_i$; can be computed by dividing the number of instances of $t_i$; by the total number of instances. Let N be the total number of training data records. As an example, the prior probability can be computed using the following SQL query:

insert into prior table
    select 'target' as attribute name, target as value,
      count(*) as prior count, count(*)/N as prior_probability
    from T
    group by target The SQL-based model building and scoring has several advantages. Since we use only standard SQL in the model building and scoring queries, it is easily portable to any RDBMS. The queries are automatically parallelized by the SQL execution engine. In contrast, some databases require hints to be specified for parallelization.

Referring to FIGS. 2 and 3, the processes of the model builder 18 and the scoring function 20 are described below. Overall, the model builder 18 generates predictive models. The model builder 18 receives training data 16 from the database 4. Training data 16 comprises a set of input values and a set of target values. Theoretically, input variables should be statistically independent of each other but practically this is not always possible. The values of all of the input variables need not be known to make a prediction. Target variables are the predicted outcomes. When the model builder 18 or scoring function 20 is supplied with continuous data 3, the data 3 values must be discretized or binned into ranges. These ranges are highly important because they significantly affect the quality of the model. Categorical attributes of the data 3 may be grouped into more generic groups to reduce the number of distinct values.

Referring to FIG. 3, the model builder 18 starts building a model by calculating the prior probability of each target value 22; this is done by first computing the number of times the target value occurs in the training data set 16. The prior probability is the number of times the target variable occurs in training data 16 divided by the total amount of training data 3. For example, if a target value occurs 7 times in a total of 10 times, the prior probability is 0.7.

Next, the model builder 18 calculates the pair-wise frequency of each input variable 24 value and target value. The pair-wise frequency is the number of times the independent value occurs in combination with each target value. The frequency is stored with each independent valiable-target value pair.

Then the model builder 18 analyzes the effect of the input variables on the target values to calculate conditional probabilities 26. The conditional probabilities are created by analyzing the frequencies. The conditional probabilities are also computed and stored along with the pair-wise counts.

In order to compute the conditional probabilities, for every predictor column $A_1$, $A_2$, . . . , $A_n$, the joint count of (predictor-column-value, target-column-value) for each distinct (predictor-column-value, target-column-value) pair must be found. The conditional probability P(predictor|target)=count(predictor, target)/count(target). The joint counts can be computed for each of the predictor columns separately, for example:

select '$A_1$' as attribute_name, Ai as attribute_value, target, joint_count
    from (select Ai, target, count(*) as joint_count
    from T
    group by Ai, target
    )

The above SQL query needs to be executed for each column Ai. This approach is inefficient if there are too many predictor columns. It is possible to find all the joint counts using a single SQL query if the input table is reverse-pivoted. Reverse-pivot is a transformation in which each row of a table with schema $(A_1, A_2, \ldots, A_n)$ is transformed into n rows with schema (sequence_id, attribute_name, value). For example, a row (value$_1$, value$_2$, ..., value$_n$) is transformed into (1, '$A_1$', value$_1$), (1, '$A_2$', value$_2$), (1, '$A_n$', value$_n$). The sequence_id connects the different attributes of the original record in the reverse pivoted table.

Let $T_p$ be the table with the schema (sequence_id, attribute_name, value) which contains the predictor attribute values and $T_t$ be the table with the schema (sequence_id, attribute_name, value) which contains the target attribute value. As an example, all the (predictor, target) joint counts can be computed with the following SQL query:

```
insert into joint_counts
select T_p.attribute_name as predictor_attribute_name,
    T_p.value as
predictor_value,
T_t.attribute_name as target_attribute_name, T_t.value as
    target_value,
count(*) as joint_count
from T_p, T_t
where T_p.sequence_id=T_t.sequence_id
group by T_p.attribute_name, T_p.value, T_t.attribute_name,
    T_t.value
```

The record corresponding to the conditional probability P(A|B) can be considered as a rule A =>B with the associated conditional probability and prior probability. In that terminology, the Naïve Bayes rules can be computed using a SQL query according to the following example:

```
insert into rule_table
select J.predictor_attribute_name, J.predictor_value,
J.target_attribute_name, J.target_value,
J.joint_count/P.prior_count as conditional_probability,
P.pior_probability
from joint_counts J, prior_table P
where P.attribute_name=J.target_attribute_name and
P.value=J.target_value
```

The previous SQL queries are just one example, and are not intended to limit the present invention to any steps, or sequence thereof.

While scoring a new set of data 28, the scoring function combines the conditional probabilities according to Naïve-Bayes theorem to predict the score of the target variable. The conditional probabilities modify the prior probabilities to predict the score of the target value. In other words, the score of a target variable may be determined by analyzing the conditional probabilities of the input variables given the target. The scoring function 20 often uses aggregate functions that are part of SQL. The more powerful the DBMS 2, the more efficient the processes. Scores may be outputted to a display 14 as required by a given application.

When a model is scored, the predictor attribute values are matched with the predictor values of the rule_table. The matching rules are grouped by the target and the probability of each target value is computed according to Bayes theorem. Let record_to_score with the schema (attribute_name, value) contain the reverse-pivoted form of the record to be scored.

As an example, the SQL queries could be:

```
select target_attribute_name, target_value,
    exp((sum(ln(conditional_probability))+ln(max(prior-
        _probability)))) as likelihood
    from rule_table R, record_to_score S
    where R.predictor_attribute_name=S.attribute_name and
    R.predictor_value=S.value
    group by target_attribute_name, target_value
```

The above SQL query computes the likelihood of each of the targets. The probabilities are converted to log scale and summed up which corresponds to taking the product on the normal scale. Max(prior_probability) just returns the prior-_probability of the target since the grouping is on the target value. As an optimization, the logarithm of the probabilities can be stored in the rule_table to avoid computing the log multiple times. Since the denominator of the Bayes theorem in the above query has been omitted, the computed likelihood need to be normalized so as to get the probability of each target. The normalization can be done in the exemplary SQL as shown below, where likelihood_query is the above query which computes the target likelihood.

```
select target_attribute_name, target_value,
    ratio_to_report(likelihood) over (partition by target_at-
        tribute_name, target_value) as target_probability
    from (likelihood_query)
```

In a classification problem, the target value with the highest probability will be the predicted target value. This step can be done as shown below where target_probability_query corresponds to the above query which computes the target probabilities.

```
select target_attribute_name, target_value, target_prob-
    ability
from (select target_attribute_name, target_value, target-
    _probability
from (target_probability_query)
order by target_probability desc
)
where rownum=1
```

This is just one example of scoring, and is not intended to limit the present invention. The SQL queries used to score can be modified or changed according to the application by those skilled in the art.

A model may be monitored to verify its continued relevance. This may be accomplished by supplying the scoring function 20 with a set of data 3 that has known patterns and known relationships.

Although the invention has been described with reference to particular embodiments, it will be understood to those skilled in the art that the invention is capable of a variety of alternative embodiments within the spirit of the appended claims.

What is claimed is:

1. A computer-implemented database management system, comprising:
    a database containing data;
    a database engine operatively connected to process said data;
    a SQL server operatively connected to said database;
    a data mining tool, said data mining tool based on a Naïve Bayes model that is built using at least a portion of said data, said SQL server using at least one SQL query to develop said data mining tool; and
    wherein the Naïve Bayes model further comprises:

$$P(\text{this-prediction}|\text{this-evidence}) = \frac{P(\text{this-evidence}|\text{this-prediction}) \; P(\text{this-prediction})}{\sum (\text{some-prediction}) \; P(\text{this-evidence}|\text{some prediction})}$$

2. The computer-implemented database management system according to claim 1, wherein said data mining tool is located in said database management system, wherein said data mining tool comprises:
- a model building system operable to build the Naïve Bayes model using at least one SQL query and training data; and
- a scoring system operable to score the Naïve Bayes model using SQL queries.

3. The computer-implemented database management system according to claim 2, wherein said model building system and said scoring system arrange said data into a plurality of groups.

4. The computer-implemented database management system according to claim 2, wherein said scoring system comprises making predictions based on said model building system.

5. The computer-implemented database management system according to claim 1, wherein said data mining tool is located in said database management system, wherein said data mining tool comprises a model building system operable to build the Naïve Bayes model using at least one SQL query and training data.

6. The computer-implemented database management system according to claim 5, wherein said model building system comprises developing a set of rules from said training data.

7. The computer-implemented database management system according to claim 1, wherein said data mining tool is located in said database management system, wherein said data mining tool comprises a scoring system operable to score the Naïve Bayes model using SQL queries.

8. A computer-implemented database management system, comprising:
- a database containing data;
- a database engine operatively connected to process said data;
- a SQL server operatively connected to said database;
- a data mining tool, said data mining tool based on a Naïve Bayes model that is built using at least a portion of said data, said SQL server using at least one SQL query to develop said data mining tool; and
- wherein the Naïve Bayes model further comprises:

$$P(ABC \ldots | \text{this-prediction}) = P(A|\text{this-prediction})P(B|\text{this-prediction})P(C|\text{this-prediction}).$$

9. A computer-implemented method for performing data mining, comprising:
- receiving data from a database;
- issuing at least one SQL query to said database;
- mining data using at least one SQL query, said mining based on a
- Naïve Bayes model; and
- wherein said Naïve Bayes model is based on:

$$P(\text{this-prediction}|\text{this-evidence}) = \frac{P(\text{this-evidence}|\text{this-prediction}) P(\text{this-prediction})}{\sum (\text{some-prediction}) P(\text{this-evidence}|\text{some prediction})}$$

10. The computer-implemented method according to claim 9, wherein said mining data comprises:
- building a model using at least one said SQL query and a set of training data; and
- scoring said model using at least one SQL query.

11. The computer-implemented method according to claim 10, wherein said building a model and said scoring a model comprises arranging said data into a plurality of groups.

12. The computer-implemented method according to claim 9, wherein said mining data comprises building a model using at least one SQL query and a set of training data.

13. The computer-implemented method according to claim 12, wherein said building a model comprises developing a set of rules from said training data.

14. The computer-implemented method according to claim 9, wherein said mining data comprises scoring said model using at least one SQL query.

15. The computer-implemented method according to claim 14, wherein said scoring a model comprises developing predictions based on said model.

16. A computer-implemented method for performing data mining, comprising:
- receiving data from a database;
- issuing at least one SQL query to said database;
- mining data using at least one SQL query, said mining based on a Naïve Bayes model; and
- wherein said Naïve Bayes model further comprises:

$$P(ABC \ldots | \text{this-prediction}) = P(A|\text{this-prediction})P(B|\text{this-prediction})P(C|\text{this-prediction}).$$

17. A computer-readable program product for performing data mining, comprising:
- a database containing data;
- a database engine operatively connected to process said data;
- a SQL server operatively connected to said database;
- a data mining tool, said data mining tool based on a Naïve Bayes model that is built using at least a portion of said data, said SQL server using at least one SQL query to develop said data mining tool; and
- wherein said Naïve Bayes model comprises:

$$P(\text{this-prediction}|\text{this-evidence}) = \frac{P(\text{this-evidence}|\text{this-prediction}) P(\text{this-prediction})}{\sum (\text{some-prediction}) P(\text{this-evidence}|\text{some prediction})}$$

18. The computer-readable program product according to claim 17, wherein said data mining tool is located in said database, wherein said data mining tool comprises:
- a model building system operable to build the Naïve Bayes model using at least one SQL query and training data; and
- a scoring system operable to score the Naïve Bayes model using SQL queries.

19. The computer-readable program product according to claim 17, wherein said data mining tool is located in said database, wherein said data mining tool comprises a model building system operable to build the Naïve Bayes model using at least one SQL query and training data.

20. The computer-readable program product according to claim 19, wherein said model building system comprises developing a set of rules from said training data.

21. The computer-readable program product according to claim 17, wherein said data mining tool is located in said database, wherein said data mining tool comprises a scoring system operable to score the Naïve Bayes model using SQL queries.

22. The computer-readable program product according to claim 21, wherein said scoring system comprises making predictions based on said model building system.

23. A computer-readable program product for performing data mining, comprising:
- a database containing data;
- a database engine operatively connected to process said data;
- a SQL server operatively connected to said database;
- a data mining tool, said data mining tool based on a Naïve Bayes model that is built using at least a portion of said data, said SQL server using at least one SQL query to develop said data mining tool; and
- wherein said Naïve Bayes model further comprises:

$$P(ABC \ldots | \text{this-prediction}) = P(A|\text{this-prediction})P(B|\text{this-prediction})P(C|\text{this-prediction}).$$

24. The computer-readable program product according to claim 18, wherein said model building system and said scoring system arrange said data into a plurality of groups.

* * * * *